United States Patent Office 3,282,291
Patented Nov. 1, 1966

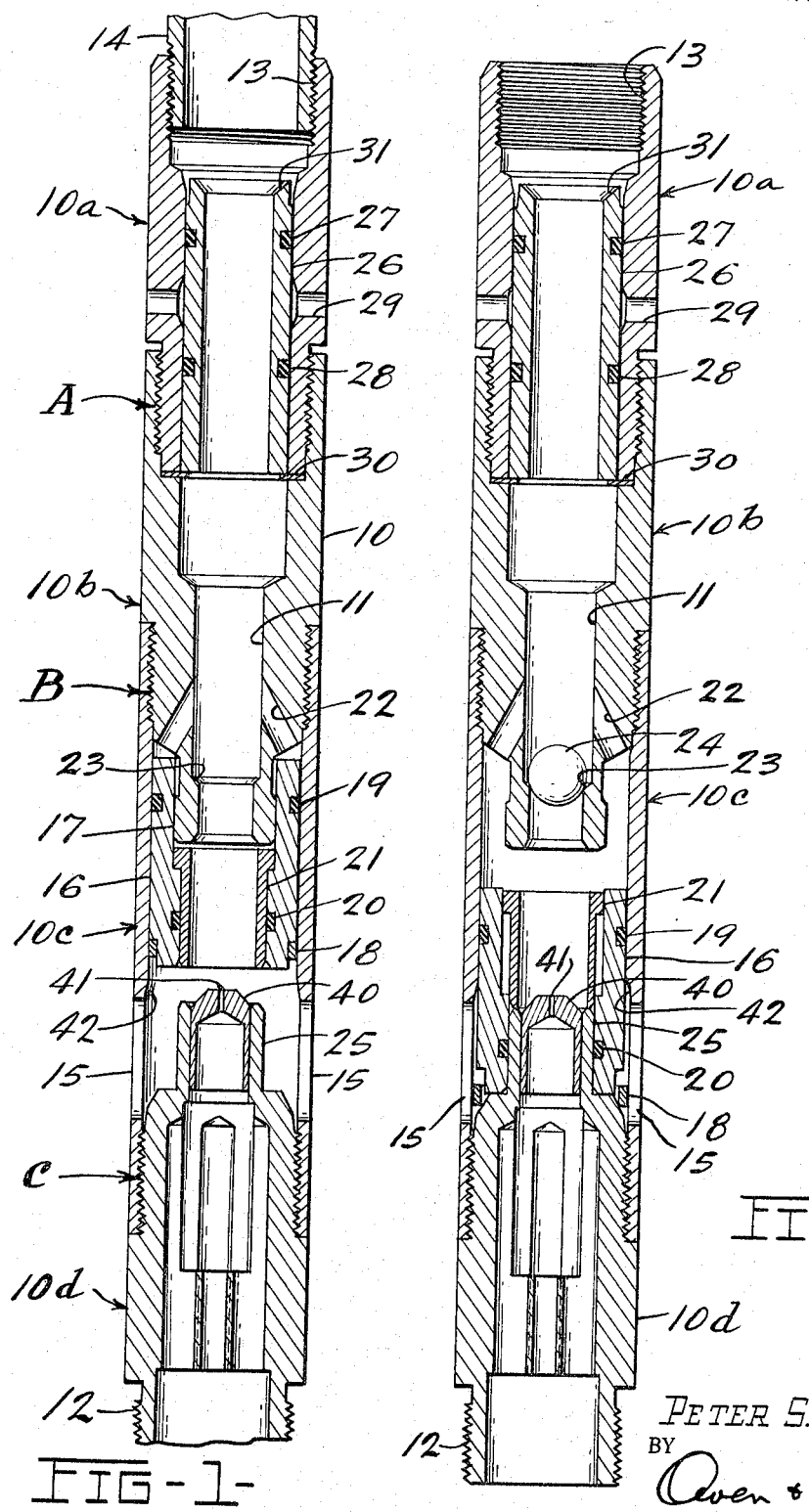

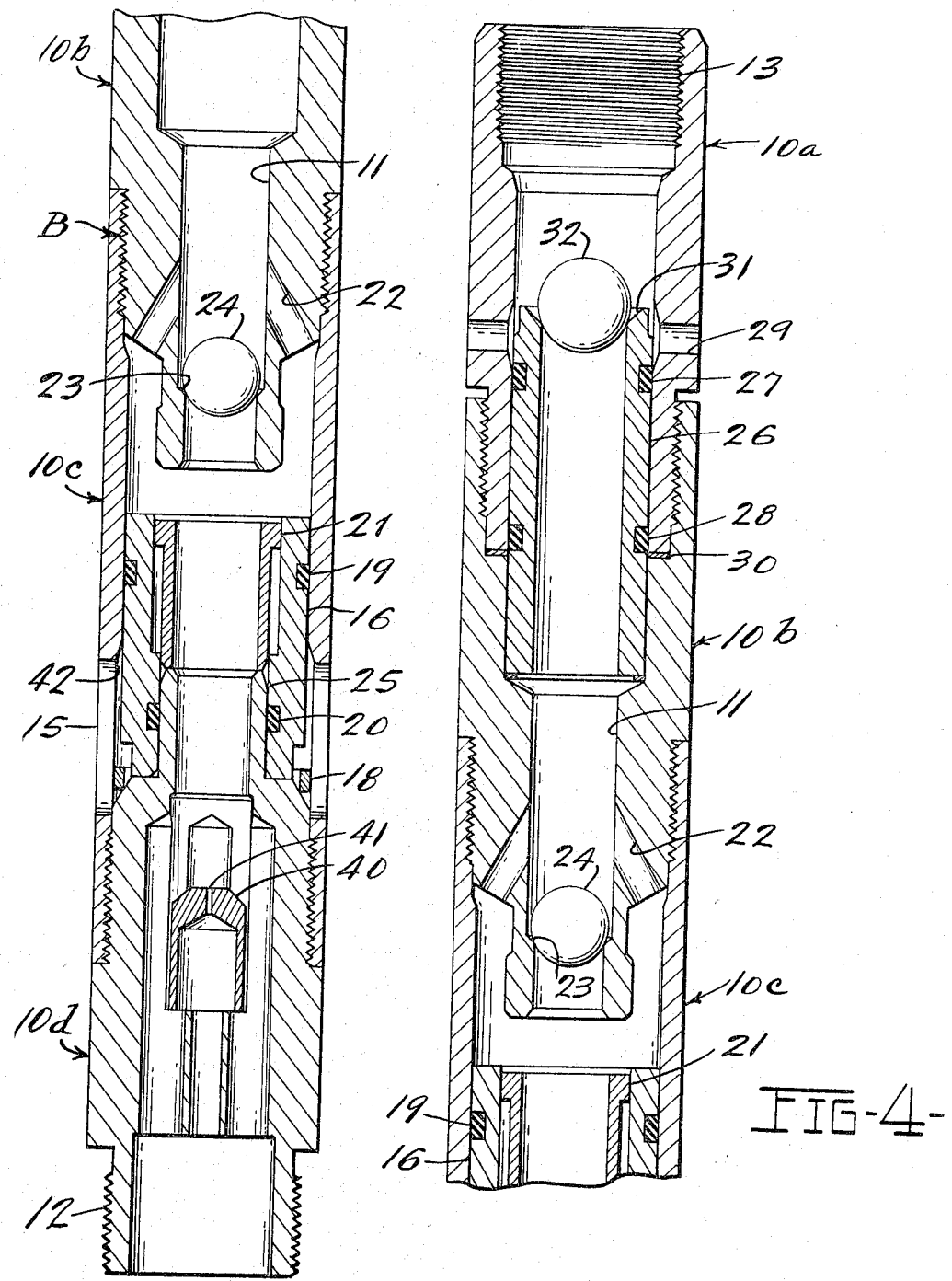

3,282,291
CIRCULATING AND BLEED VALVE STRUCTURE FOR DOWNWELL PUMPS
Peter S. Bloudoff, Whittier, Calif., assignor to Armco Steel Corporation, Middletown, Ohio, a corporation of Ohio
Filed Mar. 30, 1964, Ser. No. 355,750
3 Claims. (Cl. 137—608)

This invention relates to a circulating and bleed valve structure for downwell pumps and is particularly directed to an assembly to be attached to a fluid actuated downwell pump of the type that receives power oil from the surface through a separate macaroni string.

Fluid actuated pumps of the type with which the invention is particularly concerned include a number of closely fitted parts that are intended to be operated with cleaned and filtered power oil and that may be damaged by oil containing solid foreign materials. Since the power oil tubing, or macaroni, is assembled length by length at the surface as the pump is installed, and since this tubing has been racked near the well head, it is not unusual for the interior to contain bits of sand, metal or other foreign material as well as excess thread lubricant applied during the assembly of the tubing. Entry of any of these into the closely fitted surfaces might cause damage to the engine section of the downwell pump. Therefore, when a fluid actuated downwell pump is seated in a well and is ready for operation, it is desirable to circulate clean, filtered power oil through the system to flush it out prior to the introduction of pressurized working fluid into the pump engine. The present invention is directed primarily to the circulating and bleed valve structure which will permit such flushing, and will also permit the power oil tubing to be drained as the pump is removed from the well as will be hereinafter fully described.

The primary object of the invention is to provide a simple and efficient valve structure that is open for circulation when the pump is first installed and that may be closed by the simple expedient of dropping a properly sized ball valve element into the well at the end of the circulation period. Thereafter, the imposition of pressure on top of the ball valve causes a port sealing element to shift to a position in which the circulating ports are cut off. The ball valve element itself is not relied upon to maintain a seal during operation, but this function is performed by the shifted port closing sleeve.

When the pump is to be withdrawn from the well a second, larger, ball valve element is introduced which, by trapping pressure fluid above it, causes the shifting of a further sleeve-type valve closing member into an open position so that the tubing is drained freely as the pump is removed.

Further objects and advantages of the invention will become apparent from the following detailed description, reference being had to the accomapnying drawings, in which:

FIG. 1 is a vertical cross-sectional view of the circulating and bleed valve structure constructed in accordance with the present invention, with the parts shown in the position in which clean fluid may be circulated into and out of the well without passing to the pump engine;

FIG. 2 is a vertical cross-sectional view of the structure shown in FIG. 1 with the parts in a position in which circulation has been cut off and the circulating port valve sleeve moved to its closed position;

FIG. 3 is a fragmentary vertical cross-sectional view of the parts shown in FIG. 2 showing the displacement of a blow plug into a position occupied during pump operation;

FIG. 4 is a fragmentary vertical sectional view showing the displacement of the bleed valve which permits the power oil tubing to be drained during pump removal.

Referring to the drawings and particularly to FIG. 1, the present invention is shown in a valve assembly that is interposed between a fluid actuated downwell pump and the string of power oil tubing by which the actuating fluid is supplied to the pump from the surface. The assembly comprises a tubular body designated generally 10 having a center passage 11 therein and having lower threads 12 to which the pump assembly may be attached, and upper threads 13 by which the body 10 is removably attached to the power oil supply tubing, the latter being fragmentarily shown at 14.

For convenience of assembly the tubular body 10 is sub-divided into upper, top center, bottom center and lower sections, 10a, 10b, 10c and 10d which are threaded together at joints A, B and C. The circulating valve structure is housed generally in the top and bottom center sections 10b and 10c and will be described first.

The tubular bottom center section 10c is sealingly threaded onto the bottom of the top center section 10b as at B, and is provided with a peripheral series of circulating ports 15 in its side wall. When these ports are open, oil will circulate freely from the center of the tubular body into the annular space around the pump and back to the surface, as will be more fully described. A slidable tubular valve member 16 is provided which is initially assembled in an open position as shown in FIG. 1, but which is moved to a closed position (FIG. 2) by hydraulic pressure imposed on its upper surface. The upper end of the valve member 16 telescopes over a downwardly extending tubular boss 17 on the bottom of the section 10b and is normally held in the open position by an expansion ring 18 positioned against the bottom of the valve member 16. The expansion ring 18 applies sufficient force against the sidewalls of the housing section 10c to normally hold the valve member in the open position. The valve member 16 carries an outer elastomeric seal ring 19 and an inner elastomeric seal ring 20 that is initially in contact with a seal retainer and guide tube 21.

A series of pressure and bypass passages 22 is formed in the lower or nose portion of the tubular top center section 10b and extend from the center supply passage to the space over the valve 16 when the latter is in its open position shown in FIG. 1. The nose of the body 10b is also provided with a center valve seat 23. This valve seat 23 is adapted to receive a first ball valve 24 (FIG. 2) by which pressure is diverted from the center passage to the pressure and bypass passages for the purpose of shifting the circulating valve body 16 from its open to closed position, and thereafter bypassing pressure fluid to the pump around the ball valve 24 as will be hereinafter described.

The lower tubular body member 10c is provided with a tubular nose extension 25 having an external diameter that gives a sliding fit with the interior of the circulating valve body 16. When the circulating valve is in its closed position (see FIG. 2), the seal retainer and guide tube 21 are in engagement with the top of the nose 25 and the interior seal ring 20 engages its outer surface to prevent leakage of pressure fluid.

The upper tubular body member 10a carries a tubular drain valve comprising a sleeve 26 having spaced upper and lower seal rings 27 and 28 and adapted to control flow from the center passage to side drain ports 29. When the drain valve is in its closed position the ports 29 are protected by the spaced seal rings 27 and 28 so that no pressure fluid will be lost through the ports during normal operation of the pump. A frangible ring, or similar destructible holding means 30 retains the drain valve body in closed position. The drain valve body has an upper valve seat 31 adapted to receive a second ball valve 32 (FIG. 4) for the purpose of trapping pressure above the drain valve body, by which the latter may be hydraulically shifted to open position.

The lower body member 10c which is attached to the engine section of the downwell pump carries a blow plug 40 that is frictionally retained in an upper flow restricting position in the nose extension 25 as shown in FIG. 1, but moved by pressure to an open position (FIG. 3) at the completion of the flushing operation. The blow plug 40 is provided with an orifice 41 by which fluid in limited quantities may pass through to the pump. This fills the space below the plug 40 with liquid and creates a pressure balance across the blow plug for the purpose of preventing displacement of the blow plug during circulation. When the circulating valve 16 is closed, the demand for fluid by the engine is greater than can be passed through the orifice 41 and a pressure drop is created across the blow plug 40 to shift it to the open position. Thereafter the blow plug presents no impedance to fluid flow.

In operation, the valve assembly so far described is assembled at the surface by threading it onto the pump assembly by the lower threads 12, and by threading the macaroni string 14 onto the threads 13. The parts are initially assembled in the positions shown in FIG. 1 so that the circulating valve body 16 is in an open position and ports 15 are unrestricted. The drain valve body 26 is assembled over the frangible retainer 30 and drain ports 29 are closed.

The pump is then lowered into the prepared well cavity in the usual manner with the macaroni string being assembled length by length at the surface. Such assembly of the macaroni string that may not have been used previously or that may have been on racks at the surface during a period of overhaul frequently brings about the inclusion of foreign matter within the string that must be removed from the system prior to operation of the pump.

After the pump has been inserted in the well and seated in the prepared cavity and is completely ready for operation, clean power oil is circulated down through the macaroni string and out through the open circulating valve ports 15. Upon its return to the surface it can be filtered, stored and re-used. When the operator has circulated clean oil through the system for a sufficient period of time he thereafter drops a small ball valve 24 which may be, for example, a 5/8" ball into the well. This will seat on the seat 23 which has been prepared to receive it. Thereafter, the imposition of a relatively high pressure at the well head causes the high pressure to appear on the top of the circulating valve sleeve 16 to force it to the closed position shown in FIG. 2. For this purpose the oil passes from the center passage of the tubular valve out through the side or bypass passages 22 to the top of the valve. As the circulating valve shifts, the top seal ring 19 slides down the interior of the top center valve body section 10c and maintains a seal at this point while the valve guide tube 21 likewise moves down until it engages the stationary nose extension 25 of the lower valve body 10d. Thereafter, the downward motion of the guide tube 21 is stopped and the interior seal ring 20 slides down over the nose extension 25 of the lower valve body section to seal against leakage from the interior of the assembly out through the circulating ports 15.

The valve member 16 and tubular boss 17 are arranged to have a larger telescopic engagement in the open position of the valve member 16 than the clearance provided between the bottom of the valve member 16 and the top of the tubular nose extension 25 in the open position of the valve. By means of this arrangement, the lower end of the valve member 16 is telescoped over the tubular cross extension 25 during downward movement of the valve 16 before the upper end moves clear of the tubular boss 17. This causes the circulating ports 15 to be closed before the bypass around the valve seat 23 is opened. It will further be seen that the bottom end of the valve member 16 always communicates with the circulating ports 15 so that a lower pressure exists on the bottom of the valve member 16 than exists on the top of the valve member 16 to produce a pressure differential which drives the valve member 16 to its full down or closed position shown in FIG. 2. The friction of the expansion member 18 against the sidewalls of the section 10c is only needed to hold the valve member 16 in the open position. To further assure that the valve member 16 will move to its full closed position, the sidewalls of the section 10c are enlarged just below the normal position of the expansion ring 18, as indicated at 42, to release the frictional holding effect of the ring 18 after the valve has started to move towards its closed position, and before the valve member 16 moves clear of the tubular boss 17. Because the top of the lower section 10d extends above the bottom of the circulating ports 15, solid particles do not accumulate around the lower end of the tubular nose extension 25 to prevent the valve member 16 from moving to its full closed position.

When the liquid level of oil that is in the well or that is circulated through the tubular body 10 rises above the orifice 41, the chamber between the pump and orifice 41 is gradually filled with oil to displace air therefrom. The pressure of the circulating oil is therefore equalized across the blow plug 40 so that it stays in place to deflect solid particles of foreign material out of the internal passage of the lower valve body 10d leading to the pump.

When the parts have attained the position shown in FIG. 2, pressure fluid is prevented from being vented directly to the well casing and a back pressure is then imposed on the blow plug 40 to move the blow plug 40 from its seated position to its free position as shown in FIG. 3. Circulation from the macaroni string thereafter bypasses around the seated ball 24 in the central supply passage of the tubular valve body and around the unseated blow plug 40 to the pump to establish the normal flow path throughout the remainder of the operation of the unit.

When it is desired to remove the pump from the well for repair or inspection it is desirable to drain the macaroni tubing as it is elevated and disassembled. According to the present invention the operator opens the top of the macroni string and drops in a second ball, larger than the first, which seats on seat 31 at the top of the drain valve sleeve 26. The macroni string is then closed and pressure is reimposed on the system, forcing the drain valve sleeve to break through the frangible ring 30 and move to its lower position as shown in FIG. 4. The drain valve is then open and the macroni string can be elevated and oil that is contained therein will drain from the bottom of the string instead of being carried to the top as would otherwise be the case.

It will be seen that the ball valve 24 used to terminate the flushing operation is not relied upon to seal against leakage during continued operation of the pump, but that leakage from the system is prevented by the sleeve valve seal rings 19 and 20. In similar fashion, the seal effected by the second, larger ball valve 32 is likewise only a temporary seal imposed to assure movement of the drain valve sleeve 26 to its open position.

While the invention has been disclosed in conjunction with a specific form and disposition of the parts, it should be expressly understood that numerous modifications and changes may be made therein without departing from the scope of the appended claims.

I claim:
1. A combination circulating and drain valve for insertion in a pressure supply conduit of a fluid actuated downwell pump, said conduit having a flow passage which will pass a ball of predetermined diameter, said valve comprising: a tubular valve body having a central passage therethrough with a pressure inlet at its top end and an outlet at its bottom end, said tubular body having sidewalls with at least one bleed port through the sidewalls adjacent its upper end at least one circulating port through its sidewalls at a point beneath said bleed port, a first tubular valve slidingly engaging the sidewalls of said central passage and movable from an upper position wherein it seals off said bleed port to a lower position wherein it opens said bleed port, said first tubular valve having a central passage therethrough and an upwardly facing valve seat which surrounds said central passage and arranged to be closed off by a ball of predetermined size received through said pressure inlet, said housing having a first partition below said lower position of said first tubular valve, said partition having a downwardly extending annular boss on its lower end with a central flow passage through said partition and boss, said partition having a second valve seat surrounding said central flow passage against which a ball of said second predetermined size will seat, said housing also having a second partition positioned below said first partition and said circulating port with an upwardly extending annular boss positioning opposite said circulating port and spaced from said downwardly extending boss, a second tubular valve having an upper position with its lower end above said circulating port and said upwardly extending boss and with its upper end telescoped over said downwardly extending boss to form a seal between said sidewalls of said tubular valve body and said downwardly extending boss, said second tubular valve being slidable to a lower position clear of said downwardly extending boss and telescoped over said upwardly extending boss to form a seal between said upwardly extending boss and said sidewalls of said valve body above said circulating port to close off said circulating port, means communicating pressure upstream from said second valve seat to the portion of said central passage between said sidewalls of said valve body and said downwardly extending boss for forcing said second tubular valve from said upper position to said lower position, the internal sidewalls of said second tubular valve having a recess adjacent the lower end thereof with a flexible seal therein for engaging said upwardly extending boss, a sleeve in said lower end of said second tubular member holding said seal in said recess when said second tubular valve is in its upper position, said sleeve being adapted to be pushed upwardly off of said seal by said upwardly extending boss when telescoped over said boss, a pressure removable plug in the internal opening of said upwardly extending boss, and passage means for equalizing pressure on opposite sides of said plug.

2. In a circulating valve for insertion in a pressure supply conduit of a fluid actuated downwell pump, said conduit having a flow passage which will pass a ball of predetermined diameter, said valve comprising: a tubular valve body having a central passage therethrough with a pressure inlet at its top end and an outlet at its bottom end, said tubular body having sidewalls with at least one circulating port through the sidewalls at a point between said inlet and outlet, said housing having a first partition between said inlet and said circulating port, said partition having a downwardly extending annular boss on its lower end with a central flow passage through said partition and boss, said partition having an upwardly facing valve seat surrounding said central flow passage and against which a ball of predetermined size received through said inlet will seat, said housing also having a second partition positioned below said first partition and said circulating port with an upwardly extending annular boss positioned opposite said circulating port and spaced from said downwardly extending boss, a tubular valve having an upper position with its lower end above said circulating port and said upwardly extending boss and with its upper end telescoped over said downwardly extending boss to form a seal between said sidewalls of said tubular valve body and said downwardly extending boss, said tubular valve being slidable to a lower position clear of said downwardly extending boss and telescoped over said upwardly extending boss to form a seal between said upwardly extending boss and said sidewalls of said valve body above said circulating port to close off said circulating port, and means for communicating pressure upstream from said valve seat to the portion of said valve central passage between said sidewalls of said valve body and said downwardly extending boss for forcing said tubular valve from said upper position to said lower position.

3. In a valve structure: an axially extending chamber of generally uniform cross section, an axially extending tubular projection extending into said chamber, a slidable valve in said chamber having an end normally spaced apart from the end of said tubular projection, said end of said valve having an axially extending opening surrounded by sidewalls adapted to be telescoped over said tubular projection, said sidewalls of said valve having a recess therein, a seal in said recess, a sleeve in said opening of said valve holding said seal in said recess, means for conducting fluid out of the space between said tubular projection and said sidewalls of said chamber, and said sleeve being arranged to be abutted by said tubular projection and slid longitudinally of said opening in said valve when said valve telescopes over said projection to an extent where said seal engages said projection.

References Cited by the Examiner

UNITED STATES PATENTS

| 1,883,071 | 10/1932 | Stone | 166—194 |
| 2,616,502 | 11/1952 | Lenz | 166—224 X |
| 2,651,368 | 9/1953 | Baker et al. | 166—194 X |
| 2,949,963 | 8/1960 | McGawen et al. | 166—224 X |
| 3,005,507 | 10/1961 | Clark et al. | 166—224 X |
| 3,094,307 | 6/1963 | Alley | 166—224 X |
| 3,211,232 | 10/1965 | Grimmer | 166—194 |

FOREIGN PATENTS 619,740  3/1949  Great Britain.

M. CARY NELSON, *Primary Examiner.*

S. SCOTT, *Assistant Examiner.*